Patented May 31, 1949

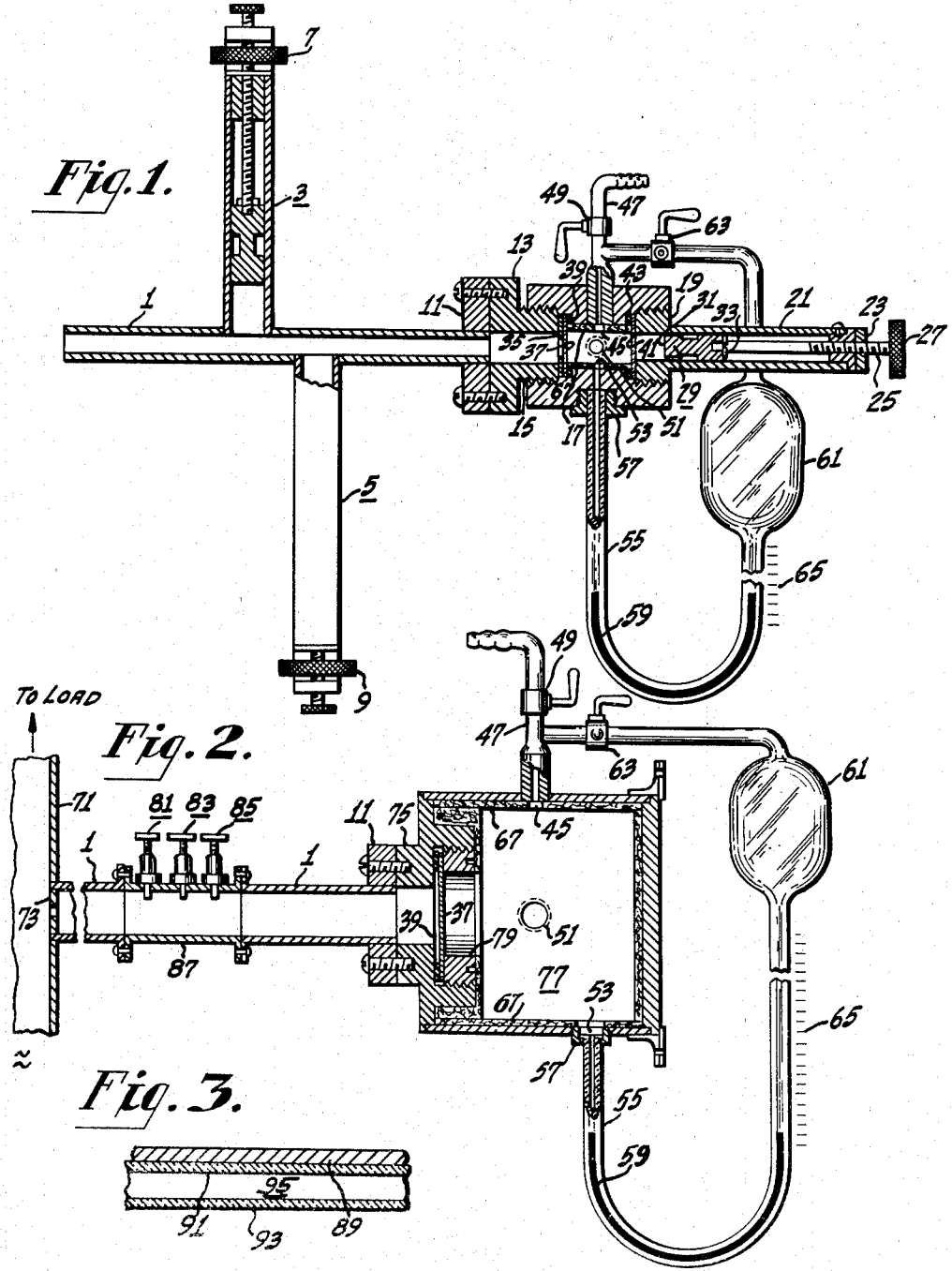

2,471,744

UNITED STATES PATENT OFFICE 2,471,744

METHOD OF AND MEANS FOR MEASURING MICROWAVE POWER

William D. Hershberger, Princeton, N. J., assignor to Radio Corporation of America, a corporation of Delaware Application May 29, 1944, Serial No. 537,960

9 Claims. (Cl. 171—95)

This invention relates generally to microwave transmission and more particularly to improved methods of and means for measuring power in microwave transmission systems.

The invention utilizes the characteristics of certain gases which are substantially perfect dielectrics at most radio frequencies but which absorb considerable energy at certain other predetermined microwave frequencies. For example, in an article by Cleeton and Williams in Physical Review 45, 234 (1934), observations on microwave absorption in ammonia gas indicated that radiation having a wavelength of 1.25 centimeters will lose approximately 63 percent of its initial energy upon passing through 1.1 meters of ammonia gas in a non-metallic container at atmospheric pressure. It was noted further that the absorption frequency band is relatively wide since the absorption coefficient falls to approximately ½ its maximum value at wavelengths of 1 centimeter and 1.5 centimeters. The observations described in the article identified heretofore were inspired by much earlier general theoretical work on the energy levels of the ammonia molecule together with observations on the infra red spectrum of this gas, but in all such prior experiments no attempt was made to determine, explain or utilize the effect upon the gas of the microwave absorption by said gas.

The instant invention provides a convenient and efficient means for utilizing the selective absorption of microwaves by ammonia and other predetermined gases, wherein the gas is enclosed within a cavity resonator which is coupled to the microwave transmission system in which the power is to be measured. At the critical frequency or frequencies at which the particular gas employed absorbs microwave energy, applicant has found the absorbed energy to be converted to heat which provides an increase in the gas pressure within the cavity resonator which may be indicated by means of any well known gas pressure indicating device. For example, the change, or rate of change, of the relative heights of the arms of a liquid enclosed within a U tube opening into the cavity resonator will provide an indication of the pressure or change of pressure within the resonator which may be calibrated in terms of the microwave power absorbed by the gas. It is believed that the temperature change in the gas due to the selective dissipation therein of microwave energy is the result of molecular resonance effects due to excitation of the energy levels of the gas molecules. The microwave energy absorption in the gas proper increases as the gas pressure is increased.

Among the objects of the invention are to provide an improved method of and means for measuring microwave energy. A further object is to provide a novel method of and means for raising the temperature of a gas by selective irradiation thereof by microwave energy. Another object of the invention is to provide an improved method of and means for measuring the microwave power in a microwave transmission system. Another object of the invention is to provide an improved method of and means for subjecting a gas to selective energy absorption of microwave energy to vary the temperature of the gas as a function of the microwave energy absorbed thereby. A further object of the invention is to provide an improved microwave measuring instrument comprising a gas-filled cavity resonator coupled to a source of microwave energy to be measured and means for indicating the variation in temperature of the enclosed gas as a function of the microwave energy absorbed thereby.

Other objects of the invention include an improved means for tuning a microwave cavity resonator. Another object of the invention is to provide an improved tuned cavity resonator having discrete resonant modes. An additional object of the invention is to provide an improved untuned cavity resonator having a plurality of substantially overlapping resonant modes.

The invention will be described by reference to the accompanying drawing of which Figure 1 is a cross-sectional elevational view of one embodiment thereof, Figure 2 is a cross-sectional elevational view of a second embodiment thereof and Figure 3 is a fragmentary cross-sectional elevational view of a modification of said first and second embodiments. Similar reference characters are applied to similar elements throughout the drawing.

Both tuned and untuned cavity resonators into which predetermined microwave energy absorbent gases may be introduced at predetermined pressures, may be employed for the measurement of microwave energy in a microwave transmission system. For the purpose of illustration, it will be assumed that the cavity resonator is filled with ammonia gas. However, various other types of gases which absorb energy in the microwave frequency range will be listed hereinafter. In the tuned cavity resonator type of apparatus illustrated in Figure 1, the microwave field to which the ammonia gas is subjected conforms to the customary modes found in relatively sharply tuned cavity resonators, and is of high intensity since substantially all of the applied microwave energy is absorbed in the resonator. This is accomplished by tuning the cavity resonator to the applied frequency by means of a tuning plunger disposed within a portion of the resonant chamber which is coupled through a microwave permeable window to the gas-tight portion of the resonator enclosing the gas. A properly dimensioned input iris bounds a second microwave permeable window which opens into the transmission waveguide. Reactive tuning elements coupled to the waveguide intermediate the source of microwave energy and the cavity resonator provide proper matching of the resonator to the transmission system substantially to prevent wave reflections and thereby to insure that all transmitted energy is confined to the cavity resonator and thereby absorbed by the gas therein.

An untuned cavity resonator of the type illustrated in Figure 2 is proportioned so that, in view of the Q of the device—which is determined by the resonator wall losses and the losses in the ammonia gas—the resonant modes are so closely spaced as to overlap. This condition may be achieved by selecting the volume of the resonator to be larger than some minimum value in view of the expected Q of the resonator. The number of resonant modes $\Delta n$ lying in the frequency range $\Delta f$, which is determined in turn by the value of Q in the relation $$\frac{\Delta f}{f} = \frac{1}{Q}$$

is approximately (1) $$\Delta n = \frac{8\pi V_0}{\lambda^3 Q}$$

where $V_0$ is the volume of the resonator and $\lambda_0$ is the wavelength.

The variation in temperature $\Delta T$ of the microwave absorbent gas within the cavity resonator may be calculated from the gas pressure change $\Delta p$ by the relation (2) $$\frac{\Delta T}{T} = \frac{\Delta p}{p}$$

where $p$ is the static pressure and $T$ is the absolute temperature.

It should be understood that the variation in temperature, and hence in the pressure of the gas within the cavity resonator in response to absorbed microwave energy, will be a function of the energy absorbed by the gas, the wall losses of the cavity resonator, and the heat transferred from the gas to the cavity resonator walls. The energy directly absorbed by the gas from the microwave transmission system provides a substantially rapid increase in gas temperature and pressure since the gas has a relatively low heat capacity and a relatively high temperature coefficient of expansion. These features therefore will provide a relatively rapid rise in the gas pressure indicated by the gas pressure indicator. However, unless the cavity resonator walls are thermally insulated from the enclosed gas, or are maintained at substantially constant temperature, the heat transfer between the cavity walls and the enclosed gas will provide a relatively slow protracted pressure variation in the enclosed gas which will provide spurious indications of the applied microwave energy. The ratio of the energy dissipated in the gas proper to the energy dissipated in the resonator walls is a function of the initial pressure of the gas in the resonator.

As will be explained hereinafter, spurious indications due to temperature variations in the cavity resonator walls may be substantially eliminated by lining the cavity resonator walls with a thermal insulator which effectively minimizes heat transfer between the walls and the gas. Also, if desired, the cavity resonator walls may be subjected to an air blast to maintain them at substantially constant temperature during the measurement period of the apparatus.

It should be understood that the cavity resonator, when properly matched to the transmission waveguide, performs substantially as a perfectly matched load which absorbs all of the microwave energy introduced thereto. Therefore, the wattmeter constructed in this manner actually absorbs all microwave energy applied to the device.

Frequently it is desirable to measure the microwave energy continuously applied to an auxiliary device. Under these conditions the power measuring apparatus comprising the wattmeter should be as efficient as possible, or alternatively, it should absorb only a predetermined fixed portion of the microwave energy transmitted from the microwave generator to the auxiliary load device. This feature may be accomplished by connecting the cavity resonator wattmeter to the main transmission waveguide through a branched waveguide which is coupled to the main waveguide through a fixed aperture device providing predetermined fixed coupling to the wattmeter. Initially, the wattmeter coupling factor may be determined by measuring separately the actual power delivered to the auxiliary load and to the wattmeter. Such a periodic coupling provides a substantially uniform energy transfer to the wattmeter over a relatively wide frequency range, thereby making the wattmeter coupling element substantially independent of operating frequency.

Referring to Figure 1 of the drawing, a waveguide 1, which may be of the conventional rectangular cross-section, includes branched waveguides 3, 5, having tuning pistons disposed therein. The pistons may be longitudinally adjusted by means of tuning knobs 7, 9, respectively, for introducing desired reactances into the waveguide 1 for matching the wattmeter to the waveguide. One end of the waveguide 1 includes a flange 11 which may be screwed to a complementarily flanged collar 13 having a threaded portion 15 adapted to engage a complementarily threaded aperture in one end of a tuned cavity resonator wall 17.

The cavity resonator comprises a relatively heavy metallic block having a central opening communicating at opposite ends with relatively large threaded apertures for engaging the threaded portion 15 of the collar 13 and a threaded portion 19 of a tuning cylinder 21, respectively.

The tuning cylinder 21 has an internal aperture coaxial and substantially coextensive with the internal aperture of the cavity resonator. The end of the tuning cylinder 21 remote from the threaded portion 19 thereof engaging the cavity resonator is terminated by a threaded apertured plug 23 which engages a coaxial complementarily threaded tuning shaft 25 terminated by a third tuning knob 27. Rotation of the third tuning knob 27 and the tuning shaft 25 within the complementarily threaded plug 23 varies the longitudinal position of a tuning plug 29 which varies the effective internal length of the cavity resonator.

The peripheral edges of the end portion 31 of the tuning plug 29 adjacent the resonant cavity are proportioned to clear slightly the inner walls of the cavity resonator to prevent erratic contact effects therewith. The central portion of the tuning plug 29 is undercut and the portion remote from the resonant cavity is proportioned to contact the inner walls of the tuning cylinder 21 to provide actual electrical contact therewith. The inner, undercut, and contacting portions each are of the order of ¼ wavelength at the operating frequency thereby providing effective tuning with minimum erratic contact effects in a manner well known in the art. A split key 33 secured to the outer end of the tuning plug 29 engages a complementary undercut shoulder near the inner end of the tuning shaft 25 to permit rotation thereof without relatively longitudinal displacement of the tuning shaft and the tuning plunger, whereby rotation of the tuning shaft provides longitudinal adjustment of the tuning plunger 29 within the tuning cylinder 21.

A coupling aperture plate 35 juxtaposed with a microwave permeable window 37, both of which are sealed to the walls of the cavity resonator 17 by means of a compressible rubber gasket 39, are held in place by the threaded end portion 15 of the collar 13 to provide an effective gas seal between the cavity resonator and the waveguide 1. Similarly, a second microwave permeable window 41 and a second compressible rubber gasket 43 held in place by the threaded end portion 19 of the tuning cylinder 21 permit tuning of the resultant gas-tight cavity occupying the space between the microwave permeable windows 37, 41, by means of the externally disposed tuning plug 29.

An intake aperture 45 in the side wall of the cavity resonator 17 communicates with a source of microwave energy absorbent gas, not shown, by means of a pipe 47 sealed into the side wall of the cavity 17. A control valve 49 is interposed in the pipe 47 to control the admission of the gas into the gas-tight cavity resonator. A vent valve 51, of any well known type which may be opened and closed at will, permits expulsion of undesired gases from the interior of the cavity resonator when the valve 49 is opened to admit the desired microwave absorbent gas.

Another aperture 53, in the inner wall of the cavity resonator, permits the attachment of a conventional U-shaped capillary tube 55, one end of which may be sealed into the cavity resonator wall by means of a gas-tight collar 57. The lower portion of the U-tube 55 is filled with a colored inert fluid column 59, the height of which may be employed to indicate the gas pressure or changes in pressure within the cavity resonator. The remote end of the U-tube 55 opens into an enlarged expansion chamber 61 which also communicates through a second valve 63 to the gas intake pipe 47 intermediate the first valve 49 and the cavity resonator 17. A suitable scale 65 adjacent one arm of the U-tube 55 may be employed to indicate the height of the colored liquid column. The scale may be calibrated directly in terms of microwave power.

Upon introducing, for example, ammonia gas into the cavity resonator, the second valve 63 is opened first and then, while the vent-valve 51 is held open, the first valve 49 is opened to admit ammonia gas until all of the air originally in the cavity resonator is expelled through the vent-valve 51. The vent-valve 51 then is closed, and the valve 49 is left open until the desired pressure of ammonia gas is attained within the cavity resonator as well as within the expansion chamber 61. Both first and second valves 49, 63 then are closed in the order named.

When microwave energy is coupled through the input aperture plate 35 from the waveguide 1 into the cavity resonator, the energy will be absorbed by the ammonia gas within the resonator, raising its temperature and hence its pressure. The variation in gas pressure thereby occurring on only one side of the U-tube 55 will vary the height of the enclosed fluid column 59 with respect to the fixed scale 65.

The cavity resonator may be tuned to resonance with the applied microwave energy by adjustment of the third control knob 27 which longitudinally displaces the tuning plug 29. With fixed microwave input the third tuning knob 27 is adjusted until maximum displacement of the liquid column 59 is obtained.

The cavity resonator impedance may be matched to the surge impedance of the waveguide 1, to eliminate substantially all wave reflections therefrom back into the waveguide, by adjustment of the control knobs 7, 9, of the reactive waveguide tuning stubs 3, 5, respectively. Thus the cavity resonator will absorb substantially all microwave energy transmitted by the waveguide 1 by providing a substantially perfect termination therefor. The energy absorbed by the cavity resonator and the ammonia gas enclosed therein will be dissipated in the form of heat generated directly in the ammonia gas and as heat generated in the cavity resonator walls due to the electrical resistance thereof.

As explained heretofore, the most desirable operating condition is to segregate as much as possible the heating effects upon the enclosed gas from the heating effects upon the cavity resonator walls. This may be accomplished by lining the interior walls of the resonant cavity with a layer of felt 67, or other thermal insulating material, to prevent effective heat transfer between the gas and the inner walls of the cavity resonator.

It should be understood that the reactive matching stubs 3, 5 coupled to the input waveguide 1 may be omitted, and any other type of reactive tuning devices known in the microwave art may be substituted therefor which will provide effective matching of the impedances of the waveguide 1 and the cavity resonator.

The electromagnetic field established within the cavity resonator will provide at least two regions of maximum flux density, since the tuning plug 29 is adjusted to provide an effective cavity resonator length of one wavelength at the operating frequency. Since the resonant characteristics of the gas enclosed within the cavity resonator are not critical with respect to frequency, the adjustment of the tuning plunger 29 need not be especially critical, and the pressure response of the enclosed gas will be substantially independent of relatively small changes in the frequency of the applied microwave energy.

Figure 2 shows an untuned cavity resonator wattmeter connected to terminate a branch waveguide 1 which is coupled to a main transmission waveguide 71 through a limiting aperture device 73. The limiting aperture device 73 is proportioned and positioned with respect to the junction of the waveguides 1 and 71 to divert a predetermined portion of the microwave energy in the main waveguide 71 to the wattmeter. As explained heretofore, the aperture device position and proportions may be calculated in a manner known in the art or they may be obtained experimentally by measuring separately the microwave power delivered from a microwave source to a load, not shown, and the diverted microwave power transmitted through the waveguide 1 to the wattmeter. It should be understood that this method of coupling the wattmeter to the microwave source to be measured also may be employed in the embodiment of the invention described and illustrated with respect to Figure 1.

The end of the wattmeter waveguide 1 remote from the main transmission waveguide 71 is terminated in a conductive flange 11 which is screwed to a complementary conductive flange 75 projecting from one end of the untuned wattmeter cavity resonator 77. The untuned cavity resonator 77 may be proportioned, as described in detail heretofore, in order to provide a relatively large number of overlapping resonant modes, the resultant of which provides relatively wide frequency band response. The opening through the flange 75 of the cavity resonator 77 is covered by a microwave permeable window 37, the edges of which are gas-sealed by means of a compressible rubber gasket ring 39. The window 37 and gasket 39 are maintained under compression by means of an externally threaded annular conductive ring 79 which is threaded to the inner side of the end of the cavity resonator 77. The entire inner surface of the cavity resonator 77 may be thermally insulated by means of an insulating layer 67 of felt or other material, as described heretofore with respect to the cavity resonator of Figure 1.

The impedances of the cavity resonator 77 and the wattmeter waveguide 1 may be substantially matched, to prevent wave reflections from the wattmeter, by means of three reactive tuning screws 81, 83, 85 disposed within a section 87 of the waveguide 1 intermediate the limiting aperture device 73 and the cavity resonator 77.

The system for introducing the microwave absorptive gas, venting undesired gases, and measuring gas pressure variation in the cavity resonator due to absorbed microwave energy may be of the type described heretofore in Figure 1 or any other type known in the art. It should be understood that, in the untuned type of cavity resonator having a large number of resonant modes, the microwave flux distribution within the cavity resonator will include a relatively large number of regions of high flux density distribution more or less uniformly spaced throughout the cavity resonator interior. Since the cavity resonator impedance is substantially matched to the wattmeter transmission waveguide 1, the resonator provides a substantially perfect termination therefor which absorbs all of the microwave energy introduced thereto. Also, since the proportions of the total microwave energy derived from the microwave source, transmitted by the main waveguide 71 and diverted to the wattmeter 77 are known, the indications provided by the height of the liquid column 59 with respect to the fixed scale 65 may be multiplied by the known factor to provide direct indications of the microwave power transmitted through the main waveguide 71. It should be understood further that any other known coupling means may be provided for deriving a predetermined portion of the power transmitted through the main waveguide for use in providing the power indications.

Figure 3 discloses an alternative thermal insulating structure which may be employed to thermally insulate the inner walls of either of the cavity resonators of the devices of Figures 1 and 2 from the microwave absorptive gases enclosed therein. The inner surface 89 of the cavity resonator wall may be covered by means of a double layer of glass 91, 93 having a space 95 therebetween which is substantially evacuated. This type of thermal insulation, which is substantially similar to the well known "Dewar flask," provides extremely effective thermal insulation while being extremely permeable to the microwave field within the cavity resonator.

It should be understood that the liquid selected for the liquid column 59 in the U tube indicator 55 should be substantially inert with respect to the particular type of microwave absorptive gas employed in the cavity resonator. For example, when employing ammonia gas, colored kerosene has been found to be satisfactory as an indicating liquid column.

Various other microwave absorptive gases have been tested and found to be quite satisfactory for microwave power measurements in apparatus of the type described heretofore. The following table discloses the microwave frequencies at which some of these various gases have been found to absorb considerable microwave energy as indicated by the absorption coefficients which have been measured:

| Gas | Wavelength | Power Absorption Coefficient per cm. |
|---|---|---|
|  | Cm. |  |
| Ethyl Chloride | 1.25 | 25×10⁻⁴ |
| Ethylene Oxide | 1.25 | 35×10⁻⁴ |
| Freon 22 | 1.25 | 17×10⁻⁴ |
| Monoethylamine | 1.25 | 6.7×10⁻⁴ |
| Ammonia | { 1.25 <br> 3.2 | 84×10⁻⁴ <br> 16×10⁻⁴ |

Thus the invention described heretofore provides an improved method of and means for measuring microwave energy which differs substantially in operation from methods and apparatus employed heretofore. The devices disclosed provide extremely convenient and accurate means for measuring microwave energy in the millimeter and centimeter wave region, since the measurements are dependent upon heat which is generated directly within a microwave absorptive gas which also is employed as the thermometric element of the power indicator. Since the thermal capacity of most gases is extremely low and the thermal coefficient of expansion is relatively high, the response of the system to applied microwave energy is relatively sensitive and rapid.

Thus the gas responsive type of wattmeter has the following advantages over wattmeters of the bolometer or circulating liquid types in present use: (1) swift response to applied microwave energy, (2) substantially greater sensitivity to applied microwave energy than circulating water-cooled measuring systems, (3) ability to withstand overloads which would damage the bolometer type of instrument, (4) adaptability to use over extremely wide ranges of power measurement, and (5) utility in the millimeter frequency range in which present types of microwave power measuring apparatus are inefficient.

I claim as my invention:

1. The method of measuring microwave energy with apparatus including a closed gas chamber comprising dissipating substantially all of said energy in said chamber and said enclosed gas to establish changes in the molecular energy levels in said gas subjected to normally fixed pressure and temperature conditions within said gas chamber to provide expansion of said gas, tuning said chamber to electrical resonance with said microwave energy, and indicating said expansion of said gas in terms of said microwave energy applied thereto and absorbed thereby.

2. The method of measuring microwave energy with apparatus including a gas chamber comprising dissipating substantially all of said energy in said gas to establish changes in the molecular energy levels in said gas subjected to normally fixed pressure and temperature conditions within said gas chamber to provide expansion of said gas, tuning said chamber to electrical resonance with said microwave energy, electrically matching said chamber to a line transmitting said energy, and indicating said expansion of said gas in terms of said microwave energy applied thereto and absorbed thereby.

3. A wattmeter for microwave energy including means defining a closed conductive chamber, a gas disposed within said chamber under normally fixed pressure and temperature conditions, microwave permeable windows in said chamber, means for introducing said energy into said chamber through one of said windows to dissipate substantially all of said energy in said gas with resultant expansion of said gas, means disposed externally of said chamber for electrically tuning said chamber through another of said windows to resonate said chamber to said microwave energy, and means for indicating said expansion of said gas in terms of said dissipated energy.

4. Apparatus of the type described in claim 3 including means for matching the impedance of said chamber to a source of said energy to effectively minimize wave reflections from said chamber.

5. A wattmeter for microwave energy including closed thermally insulated conductive means for enclosing a microwave energy absorptive gas, means for dissipating in said gas substantially all of said energy to be measured to excite a change in the molecular energy levels in said gas with resultant expansion thereof, means for indicating said expansion of said gas in response to said molecular energy level changes in terms of the microwave power absorbed by said gas, and means for electrically matching the impedance of said gas enclosing means to a line transmitting the microwave energy to be measured.

6. A wattmeter for microwave energy including closed thermally regulated conductive means for enclosing a microwave energy absorptive gas, means for dissipating in said gas substantially all of said energy to be measured to excite a change in the molecular energy levels in said gas with resultant expansion thereof, means for indicating said expansion of said gas in response to said molecular energy level changes in terms of the microwave power absorbed by said gas, and means for electrically matching the impedance of said gas enclosing means to a line transmitting the microwave energy to be measured.

7. A wattmeter for microwave energy including means defining a closed conductive chamber, ammonia gas disposed in said chamber under normally fixed pressure and temperature conditions, means for dissipating substantially all of said energy in said gas to vary the pressure thereof due to changes in the molecular energy levels established in said gas in response to said dissipated energy, means for indicating said pressure variations in terms of said dissipated energy, and means external of said chamber for tuning said chamber to resonate to said microwave energy.

8. Apparatus of the type described in claim 7 including means for matching the impedance of said chamber to a source of said energy to effectively minimize wave reflections from said chamber.

9. A wattmeter for microwave energy including means defining a closed conductive chamber, a gas disposed within said chamber under normally fixed pressure and temperature conditions, a microwave permeable window in said chamber, means for introducing said energy into said chamber to dissipate substantially all of said energy in said gas with resultant expansion of said gas, means disposed externally of said chamber for electrically tuning said chamber through said window to resonate said chamber to said microwave energy, and means for indicating said expansion of said gas in terms of said dissipated energy.

WILLIAM D. HERSHBERGER.

REFERENCES CITED

The following references are of record in the file of this patent:

UNITED STATES PATENTS

| Number | Name | Date |
|---|---|---|
| 456,172 | Thomson | July 21, 1891 |
| 763,164 | Donitz | June 21, 1904 |
| 850,065 | Shoemaker | Apr. 9, 1907 |
| 1,900,573 | McArthur | Mar. 7, 1933 |
| 1,940,759 | Lincoln | Dec. 26, 1933 |
| 2,151,118 | King et al. | Mar. 21, 1939 |
| 2,179,261 | Keller | Nov. 7, 1939 |
| 2,212,211 | Pfund | Aug. 20, 1940 |
| 2,241,119 | Dallenbach | May 6, 1941 |
| 2,241,976 | Blewett et al. | May 13, 1941 |
| 2,262,020 | Llewellyn | Nov. 11, 1941 |
| 2,398,606 | Wang | Apr. 16, 1946 |
| 2,400,777 | Okress | May 21, 1946 |
| 2,405,841 | Brannin | Aug. 13, 1946 |

OTHER REFERENCES

Publication in "Physical Review," vol. 45, page 234 (1934) by Cleeton and Williams. (Copy in Patent Office Library.)